L. E. BOGEN.
MOTOR CONTROL SYSTEM.
APPLICATION FILED JULY 28, 1911.
1,093,378.
Patented Apr. 14, 1914.
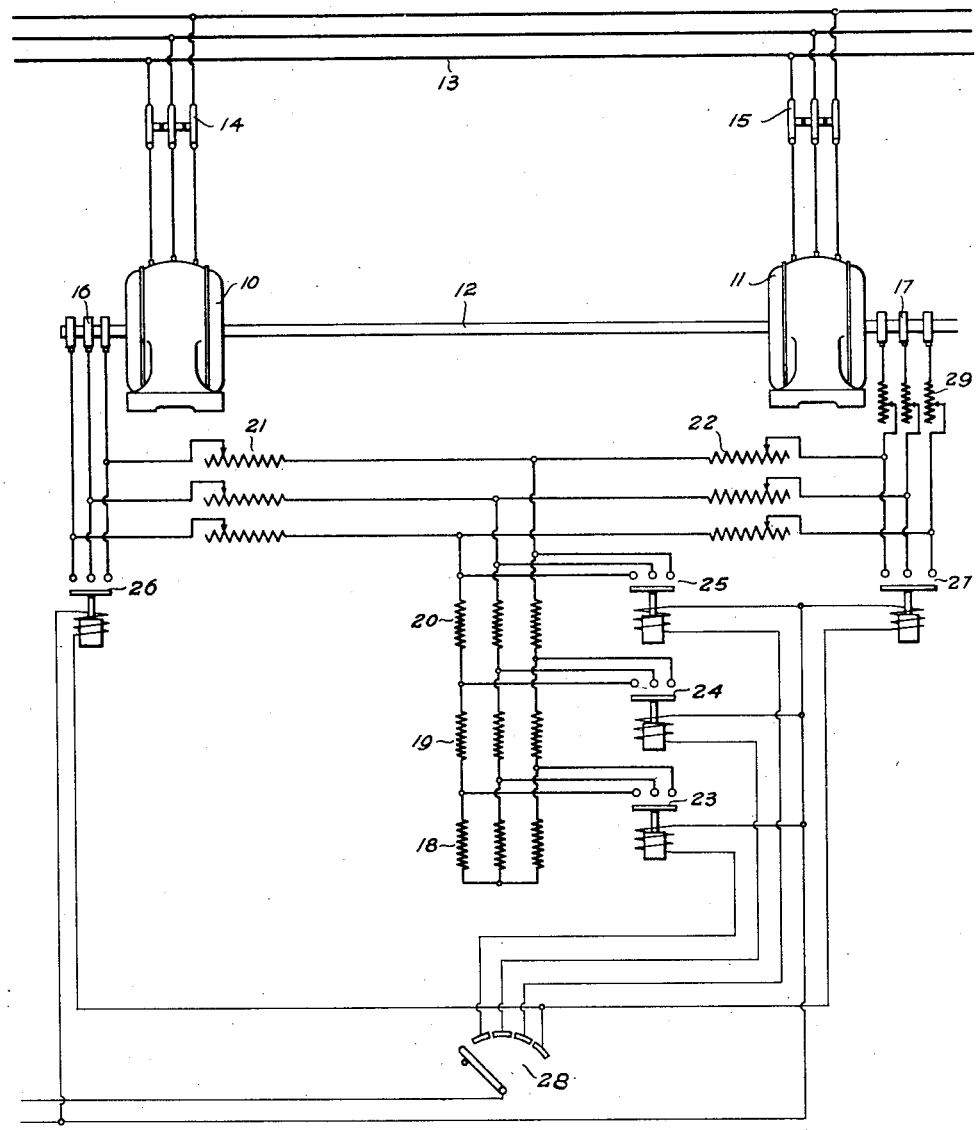

UNITED STATES PATENT OFFICE.

LOUIS E. BOGEN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

MOTOR-CONTROL SYSTEM.

1,093,378. Specification of Letters Patent. Patented Apr. 14, 1914.

Application filed July 28, 1911. Serial No. 641,128.

*To all whom it may concern:*

Be it known that I, LOUIS E. BOGEN, a citizen of the United States, residing at Milwaukee, in the county of Milwaukee and State of Wisconsin, have invented certain new and useful Improvements in Motor-Control Systems, of which the following is a full, clear, and exact specification.

My invention relates to motor control systems.

It is quite frequently desirable to use two or more motors for a common load, the motors being mechanically connected as by being mounted on the same shaft. In such cases, any slight differences in the characteristics of the motors tend to produce a disproportionate division of the load. When a plurality of motors are thus used for a common load, it is often essential that the motors be controlled in common.

It is the object of my present invention to provide a common controlling means for the motors of such a system; and at the same time to counteract any tendency toward a disproportionate division of the load and to avoid cross-currents between the motors.

In carrying out my invention, a common variable resistance is used for the plurality of motors. This variable resistance is connected to the motors through separate resistances respectively. Two of these separate resistances are in series for cross-currents between any two motors, and effectually prevent such cross-currents. These separate resistances are preferably made adjustable in order to control the division of the load between the motors; and, if desired, part or all of each of them may be arranged to be short-circuited for control purposes.

The various novel features of my invention will appear from the description and drawings, and will be particularly pointed out in the claims.

The single figure of the drawing shows diagrammatically a control system embodying my invention.

The two motors 10 and 11 have their rotating elements mechanically connected, as by being mounted on the common shaft 12 driving the common load. The motors 10 and 11 are shown as induction motors of the wound rotor type. Their primary circuits may be connected to the three phase supply circuit 13 by switches 14 and 15 respectively, and their secondary or rotor circuits are connected, through sets of slip rings 16 and 17 respectively, to the variable resistance. The variable resistance comprises three sections 18, 19, and 20 which are common to the two motors, the upper ends of the resistance section 20 being connected, through other resistance sections 21 and 22 respectively, to the slip rings 16 and 17. The various resistance sections may be cut out by solenoid-operated switches 23, 24, 25, 26, and 27, the operating solenoids of which are energized from any suitable source and controlled by a master controller 28. The extreme right hand button of the master controller 28 preferably controls the operating solenoids of both switches 26 and 27.

In order to start the motors, the switches 14 and 15 are closed while the master controller 28 is in its extreme left hand position. As the motors 10 and 11 gain in speed, the arm of the master controller 28 is moved to the right, causing the successive energization of the operating solenoids of the switches 23, 24, 25, and 26 and 27. and the successive cutting out of the resistance sections 18, 19, 20, and 21 and 22. During this time, as well as during the running of the motor with all the resistance sections 18 to 22 inclusive cut out, cross-currents between the two motors are practically prevented by the resistances 21 and 22, which are always in series for such cross-currents.

If because of any dissimilarity between the two motors 10 and 11, one of the motors tends to take more than its share of the load, such tendency can be corrected by proper adjustment of the resistance values of the resistance sections 21 and 22, which are preferably made adjustable for that purpose. If the tendency still exists after the short-circuiting of the resistances 21 and 22, a resistance 29, which is preferably adjustable, may be placed permanently in the secondary circuit of any motor which tends to take more than its share of the load. This resistance 29 reduces the proportionate part of the load taken by its associated motor; so that by proper adjustment of said resistance the proportionate division of the load between the motors may be further adjusted.

I have shown my invention as applied to two induction motors of the wound rotor type, with the resistance of the secondary circuit remotely controlled. This is a mere matter of illustration, as my invention in its broader aspects is not so limited. Various other obvious modifications may also be made, and I aim to cover all modifications which do not involve a departure from the spirit and scope of my invention as set forth in the following claims.

What I claim as new is:

1. In combination, a plurality of motors mechanically connected, a common sectional resistance therefor, a separate resistance through which each motor is connected to the common resistance, means for cutting out sections of said sectional resistance, means for cutting out said separate resistances, and separate means for regulating the division of load between said motors.

2. In combination, a plurality of induction motors of the wound rotor type connected together, a common sectional resistance for the secondary circuits thereof, a separate resistance through which the secondary winding of each motor is connected to said common resistance, means for cutting out sections of said common resistance, means for cutting out said separate resistances, and separate means for regulating the division of load between said motors.

3. In combination, a plurality of induction motors of the wound rotor type connected together, a common sectional resistance for the secondary circuits thereof, a separate resistance through which the secondary winding of each motor is connected to said common resistance, a power-operated switch for cutting out each section of said common resistance, a power-operated switch for cutting out each of said separate resistances, and separate means associated with one of said motors for regulating the division of load between said motors.

4. In combination, a plurality of induction motors of the wound rotor type connected together, a common sectional resistance for the secondary circuits thereof, a separate resistance through which the secondary winding of each motor is connected to said common resistance, a power-operated switch for cutting out each section of said common resistance, a power-operated switch for cutting out each of said separate resistances, common means for controlling all said power-operated switches, and separate means associated with one of said motors for regulating the division of load between said motors.

5. In combination, a plurality of motors mechanically connected so as to be capable of driving a common load, a common resistance therefor, a separate resistance through which each motor is connected to the common resistance, means for cutting out said common resistance, means for cutting out said separate resistances, and separate means for regulating the division of load between said motors.

In testimony whereof I affix my signature, in the presence of two witnesses.

LOUIS E. BOGEN.

Witnesses:
CHAS. L. BYRON,
ROB. E. STOLL.

---

Copies of this patent may be obtained for five cents each, by addressing the "Commissioner of Patents, Washington, D. C."